(12) United States Patent
Bauers et al.

(10) Patent No.: US 8,952,096 B2
(45) Date of Patent: Feb. 10, 2015

(54) GRAFT COPOLYMERS AND USE THEREOF AS LOW-PROFILE ADDITIVES

(75) Inventors: Florian Bauers, Mühldorf (DE); Michael Tobias Zarka, Burghausen (DE)

(73) Assignee: Wacker Chemie AG, Munich (DE)

( * ) Notice: Subject to any disclaimer, the term of this patent is extended or adjusted under 35 U.S.C. 154(b) by 407 days.

(21) Appl. No.: 13/133,862

(22) PCT Filed: Dec. 9, 2009

(86) PCT No.: PCT/EP2009/066714
§ 371 (c)(1),
(2), (4) Date: Jun. 9, 2011

(87) PCT Pub. No.: WO2010/066781
PCT Pub. Date: Jun. 17, 2010

(65) Prior Publication Data
US 2011/0257297 A1    Oct. 20, 2011

(30) Foreign Application Priority Data
Dec. 10, 2008 (DE) .......................... 10 2008 054 482

(51) Int. Cl.
| | | |
|---|---|---|
| C08F 263/02 | (2006.01) | |
| C08F 263/04 | (2006.01) | |
| C08L 51/00 | (2006.01) | |
| C08L 51/08 | (2006.01) | |
| C09D 151/00 | (2006.01) | |
| C09D 151/08 | (2006.01) | |
| C08F 290/06 | (2006.01) | |
| C08F 290/08 | (2006.01) | |
| C08F 283/01 | (2006.01) | |
| C08F 263/00 | (2006.01) | |
| C08F 289/00 | (2006.01) | |

(52) U.S. Cl.
CPC ............. *C08F 263/04* (2013.01); *C08F 263/00* (2013.01); *C08F 283/01* (2013.01); *C08F 289/00* (2013.01); *C08F 290/06* (2013.01); *C08L 51/003* (2013.01); *C08L 51/08* (2013.01); *C09D 151/003* (2013.01); *C09D 151/08* (2013.01)
USPC ............ 525/69; 525/64; 525/70; 525/71; 525/244; 525/277; 524/563; 524/564

(58) Field of Classification Search
CPC ............ C09D 151/00; C09D 151/003; C09D 151/08; C08F 265/02; C08F 269/00; C08F 263/04; C08F 290/06; C08F 283/01; C08F 289/00; C08F 263/00; C08L 51/08; C08L 51/003
USPC ........... 523/400, 436; 524/564, 563; 525/286, 525/301, 63, 64, 69, 70, 71, 244, 266, 277
See application file for complete search history.

(56) References Cited

U.S. PATENT DOCUMENTS

| | | | |
|---|---|---|---|
| 3,317,453 A | 5/1967 | MacDonald et al. | |
| 3,437,514 A | 4/1969 | Burlant | |
| 3,574,157 A | 4/1971 | Markus | |
| 3,579,490 A | 5/1971 | Kordzinski et al. | |
| 3,616,364 A | 10/1971 | D'Alelio | |
| 3,649,337 A | 3/1972 | Johnson et al. | |
| 3,718,714 A | 2/1973 | Comstock | |
| 3,997,627 A | 12/1976 | Ichimura et al. | |
| 4,122,132 A * | 10/1978 | Murata et al. ................... 525/69 |
| 4,245,059 A | 1/1981 | Ichimura et al. | |
| 4,284,736 A | 8/1981 | Comstock et al. | |
| 4,303,762 A | 12/1981 | Nakayama | |
| 4,341,877 A | 7/1982 | Das et al. | |
| 4,448,941 A | 5/1984 | Cheung et al. | |
| 4,473,618 A | 9/1984 | Adzima et al. | |
| 4,525,498 A | 6/1985 | Atkins et al. | |
| 4,618,658 A | 10/1986 | Hefner, Jr. et al. | |
| 4,716,080 A | 12/1987 | Lewin | |
| 5,143,974 A | 9/1992 | Nagai | |
| 5,484,850 A | 1/1996 | Kempter et al. | |
| 5,712,036 A | 1/1998 | Piret | |
| 5,763,546 A | 6/1998 | Jung et al. | |
| 6,187,861 B1 | 2/2001 | Weitzel | |

(Continued)

FOREIGN PATENT DOCUMENTS

| | | |
|---|---|---|
| DE | 1932715 | 2/1970 |
| DE | 24 41 025 | 3/1975 |

(Continued)

OTHER PUBLICATIONS

International Search Report for PCT/EP2009/066714 filed Dec. 9, 2009, mailed Feb. 2, 2010.

(Continued)

*Primary Examiner* — Randy Gulakowski
*Assistant Examiner* — Ha Nguyen
(74) *Attorney, Agent, or Firm* — RatnerPrestia

(57) ABSTRACT

The invention provides graft copolymers obtainable by A) free-radically initiated polymerization of one or more vinyl esters a), one or more further ethylenically unsaturated monomers b) comprising at least one further functional group, B) subsequent polymer-analogous reaction of the copolymers from stage A) by joining the monomer units b) thereof to one or more further monomers b) such that at least one free-radically polymerizable group is introduced into the copolymers from stage A), characterized in that C) one or more ethylenically unsaturated monomers are polymerized onto the products from stage B) by free-radically initiated polymerization.

18 Claims, No Drawings

(56) References Cited

U.S. PATENT DOCUMENTS

| | | | |
|---|---|---|---|
| 6,262,167 B1 * | 7/2001 | Weitzel et al. | 524/513 |
| 6,329,475 B1 | 12/2001 | Kelly | |
| 6,559,236 B1 * | 5/2003 | Willimann et al. | 525/293 |
| 6,576,698 B1 | 6/2003 | Weitzel | |
| 6,746,555 B1 | 6/2004 | Kunstle | |
| 7,030,198 B2 | 4/2006 | Godi et al. | |
| 7,122,595 B1 | 10/2006 | Ott et al. | |
| 8,648,159 B2 | 2/2014 | Kohler et al. | |
| 2002/0002353 A1 | 1/2002 | Michal et al. | |
| 2002/0074095 A1 | 6/2002 | Wierer et al. | |
| 2002/0161138 A1 | 10/2002 | Honjo et al. | |
| 2003/0065079 A1 | 4/2003 | Weitzel | |
| 2004/0054108 A1 * | 3/2004 | Mestach et al. | 526/319 |
| 2004/0097701 A1 | 5/2004 | Weitzel | |
| 2004/0106759 A1 * | 6/2004 | Mestach et al. | 526/319 |
| 2004/0224001 A1 | 11/2004 | Pacetti et al. | |
| 2006/0025551 A1 | 2/2006 | Kaiser et al. | |
| 2007/0295246 A1 | 12/2007 | Bacher et al. | |
| 2008/0114125 A1 * | 5/2008 | Bzowej et al. | 525/94 |
| 2009/0182090 A1 | 7/2009 | Graewe | |
| 2009/0270524 A1 | 10/2009 | Oka et al. | |
| 2009/0306302 A1 * | 12/2009 | Lacroix-Desmazes et al. | 525/279 |
| 2009/0321016 A1 | 12/2009 | Kaiser et al. | |
| 2010/0256287 A1 * | 10/2010 | Kohler et al. | 524/517 |
| 2010/0273934 A1 * | 10/2010 | Kohler et al. | 524/556 |

FOREIGN PATENT DOCUMENTS

| | | |
|---|---|---|
| DE | 103 09 857 | 9/2004 |
| DE | 102006019686 | 10/2007 |
| DE | 102007055694 | 6/2009 |
| EP | 0 075 765 | 4/1983 |
| EP | 0 351 831 | 1/1990 |
| EP | 0414468 | 2/1991 |
| EP | 0 506 703 | 6/1994 |
| EP | 0 897 376 | 1/2002 |
| EP | 1 203 647 | 5/2002 |
| EP | 1 682 591 | 8/2008 |
| EP | 1 812 478 | 12/2008 |
| GB | 1155498 | 6/1969 |
| GB | 1174391 * | 12/1969 |
| GB | 1 264 552 | 2/1972 |
| GB | 1 456 412 | 11/1976 |
| GB | 2087416 | 5/1982 |
| JP | 04-325531 | 11/1992 |
| JP | 08-221738 | 8/1996 |
| WO | 9509202 | 4/1995 |
| WO | WO 01/16207 | 3/2001 |
| WO | WO 2006/103969 | 10/2006 |
| WO | 2009071506 | 6/2009 |

OTHER PUBLICATIONS

Giani, Elena; "International Search Report"; Nov. 3, 2009; 2 pp; European Patent Office, Rijswijk, The Netherlands.
Hammond, Andrew; "International Search Report,"; Feb. 23, 2009; 3 pp; European Patent Office, Rijswijk, The Netherlands.
Office Action mailed Oct. 4, 2012 in U.S. Appl. 12/745,440.
Final Office Action mailed Mar. 7, 2013 in U.S. Appl. No. 12/745,440.
Office Action mailed Jun. 6, 2012 in U.S. Appl. No. 12/746,035.
Final Office Action mailed Oct. 15, 2012 in U.S. Appl. No. 12/746,035.
Office Action mailed Apr. 4, 2014 in U.S. Appl. No. 12/746,035.
Amendment to Office Action of Oct. 4, 2012 for U.S. Appl. No. 12/745,440 (dated Jan. 4, 2013).
Amendment to Final Office Action of Mar. 7, 2013 for U.S. Appl. No. 12/745,440 (dated Aug. 5, 2013).
Amendment to Office Action of Jun. 6, 2012 for U.S. Appl. No. 12/746,035 (dated Sep. 6, 2012).
Amendment to Final Office Action of Oct. 15, 2012 for U.S. Appl. No. 12/746,035 (dated Feb. 15, 2013).
Amendment to Final Office Action of Mar. 7, 2013 for U.S. Appl. No. 12/745,440 (dated Jun. 6, 2013).

* cited by examiner

GRAFT COPOLYMERS AND USE THEREOF AS LOW-PROFILE ADDITIVES

CROSS REFERENCE TO RELATED APPLICATIONS

This application is the national phase filing of international patent application No. PCT/EP2009/066714, filed 9 Dec. 2009, and claims priority of German patent application number 10 2008 054 482.5, filed 10 Dec. 2008, the entireties of which applications are incorporated herein by reference.

FIELD OF THE INVENTION

The invention relates to graft copolymers, processes for producing same, and also to use of same by way of example as low-profile additives (LPAs).

BACKGROUND OF THE INVENTION

The production of composite components often uses polymer compositions which are based, for example, on unsaturated polyester resins (UP resins) and which are capable of free-radical crosslinking. Unsaturated polyester resins are obtainable via polycondensation of dicarboxylic acids or of dicarboxylic anhydrides with polyols. The polymer compositions capable of free-radical crosslinking also comprise monomers having ethylenically unsaturated groups, generally styrene. By way of example, styrene is added to the polymer composition capable of free-radical crosslinking in order to dissolve the crosslinkable polymer and to ensure that the polymer composition capable of free-radical crosslinking is flowable. Other constituents often present in the polymer compositions capable of free-radical crosslinking are fiber materials, such as glass fibers, carbon fibers, or corresponding fiber mats (Fiber Reinforced Plastic composites=FRP composites), where these lead to reinforcement of the composite components obtainable via hardening of the polymer compositions capable of free-radical crosslinking.

A problem that occurs when these polymer compositions capable of free-radical crosslinking are processed to give composite components is volume shrinkage during the curing of the polymer composition. The materials known as low-profile additives (LPAs) are therefore added to the polymer compositions capable of free-radical crosslinking, in order to reduce shrinkage during hardening. Low-profile additives reduce shrinkage during hardening, dissipate intrinsic stresses, reduce microcracking, and facilitate compliance with manufacturing tolerances. The low-profile additives usually involve thermoplastics, such as polystyrene, polymethyl methacrylate, and in particular polyvinyl acetate, and these often also comprise carboxy-functional comonomer units. Corresponding low-profile additives based on vinyl acetate and on ethylenically unsaturated carboxylic acids are described by way of example in U.S. Pat. No. 3,718,714 or DE-A 102006019686.

Copolymers based on vinyl acetate and styrene have also been described as LPAs for unsaturated polyester resins. By way of example, EP-A 0414468 has disclosed UP resins where A-B block copolymers are added as LPAs, where the A block is composed of vinyl acetate and butyl acrylate, and the B block is composed of styrene or of copolymers thereof. However, it is necessary to use specific polymeric peroxides for the hardening of these UP resins. The patents GB 2087416 and U.S. Pat. No. 4,303,762 also describe UP resins with use of block copolymers made of vinyl acetate copolymers and styrene copolymers as LPAs. Here again, specific polymeric peroxides are used in the hardening process.

DE-A 102007055694 discloses polymers which are obtained via polymerization of vinyl esters and of ethylenically unsaturated epoxy-functional monomers and subsequent polymer-analogous reaction of the resultant polymers with an ethylenically unsaturated carboxylic acid. DE-A 102007055694 describes the hardening of the polymers via free-radical-initiated polymerization, and also the use of the polymers as LPAs.

However, the LPA effect of the polymers described is apparent only during the curing of crosslinkable polymer compositions at elevated temperatures. The LPAs commonly used exhibit no, or inadequate, effectiveness at room temperature. However, there are many processes for producing composite components where the hardening of the crosslinkable polymer compositions specifically takes place at low temperatures, for example at room temperature: examples are the hand-lay-up process or infusion processes or injection processes, for example vacuum infusion, or resin transfer molding (RTM).

SUMMARY OF THE INVENTION

Against this background, it was an object to provide low-profile additives (LPAs) which counter volume shrinkage as a consequence of the hardening of polymer compositions capable of free-radical crosslinking, even when the hardening process takes place at low temperatures, for example at room temperature.

Surprisingly, the object is achieved by using graft copolymers which are obtained by a method where vinyl ester copolymers are first subjected to a polymer-analogous reaction and are then grafted with ethylenically unsaturated monomers. The graft copolymers feature a particular polymer architecture as a consequence of said production process.

DETAILED DESCRIPTION OF THE INVENTION

The invention provides graft copolymers obtainable via
A) free-radical-initiated polymerization of one or more vinyl esters a),
and of one or more further ethylenically unsaturated monomers b) comprising at least one further functional group,
B) and then polymer-analogous reaction of the copolymers from stage A), by linking monomer units b) thereof to one or more further monomers b) in such a way that at least one group capable of free-radical polymerization is introduced into the copolymers from stage A), characterized in that
C) free-radical-initiated polymerization is used to polymerize one or more ethylenically unsaturated monomers onto the products from stage B).

Vinyl esters a) used in stage A) preferably comprise one or more vinyl esters of unbranched or branched carboxylic acids having from 1 to 20 carbon atoms, particularly preferably from 1 to 15 carbon atoms. Examples of particularly preferred vinyl esters are vinyl acetate, vinyl propionate, vinyl butyrate, vinyl 2-ethylhexanoate, vinyl laurate, 1-methylvinyl acetate, and vinyl esters of α-branched monocarboxylic acids having from 5 to 13 carbon atoms, for example vinyl pivalate, VeoVa9®, VeoVa10® or VeoVa11® (trademarks of Hexion). Most preference is given to vinyl acetate, vinyl pivalate, vinyl laurate, VeoVa9®, and VeoVa10®.

It is preferable in stage A) to use from 15 to 99.9% by weight of vinyl ester a), particularly from 20 to 99% by weight, based in each case on the total weight of the monomers for producing the copolymers in stage A).

Preferred monomers b) used are the following, which are hereinafter termed nucleophilic monomers b): ethylenically unsaturated mono- and dicarboxylic acids and salts thereof, preferably crotonic acid, acrylic acid, methacrylic acid, fumaric acid, or maleic acid, long-chain fatty acids; monoesters of fumaric acid or of maleic acid, preferably ethyl or isopropyl esters thereof; ethylenically unsaturated sulfonic acids and salts thereof, preferably vinylsulfonic acid, 2-acrylamido-2-methylpropanesulfonic acid; ethylenically unsaturated alcohols, preferably 2-hydroxyethyl methacrylate, hydroxypropyl methacrylate, 2-hydroxyethyl acrylate, hydroxypropyl acrylate, or glycerol 1-allyl ether; ethylenically unsaturated primary, secondary, or tertiary amines, preferably 2-dimethylaminoethyl methacrylate, 2-tert-butylaminoethyl methacrylate, allyl N-(2-aminoethyl)carbamate hydrochloride, allyl N-(6-aminohexyl)carbamate hydrochloride, allyl N-(3-aminopropyl) hydrochloride, allylamine, or vinylpyridine; ethylenically unsaturated amides, preferably 3-dimethylaminopropylmethacrylamide, 3-trimethylammoniumpropylmethacrylamide chloride; phosphonic acids and salts thereof, preferably vinylphosphonic acid, SIPOMER PAM-100® or SIPOMER-200® (trademark of Rhodia).

Particularly preferred nucleophilic monomers b) are crotonic acid, acrylic acid, methacrylic acid, 2-hydroxyethyl acrylate, and 2-hydroxyethyl methacrylate.

Other preferred monomers b) used with preference are the following, which are hereinafter termed electrophilic monomers b): ethylenically unsaturated epoxides having from 1 to 20 carbon atoms, preferably from 1 to 10 carbon atoms, particularly preferably glycidyl acrylate, glycidyl methacrylate (GMA), or allyl glycidyl ether; ethylenically unsaturated isocyanates, preferably 1-(isocyanato-1-methyl)-3-(methylethyl)benzene); and ethylenically unsaturated anhydrides, preferably maleic anhydride.

Particularly preferred electrophilic monomers b) are glycidyl acrylate and glycidyl methacrylate; glycidyl methacrylate is most preferred.

Stage A) preferably uses from 0.1 to 20% by weight, particularly from 0.2 to 15% by weight, very particularly from 0.5 to 10% by weight, and most preferably from 0.5 to 4% by weight, of monomers b), based in each case on the total weight of the monomers for producing the copolymers from stage A).

Additional monomers which can be used in stage A) are one or more monomers c) selected from the group comprising methacrylic esters and acrylic esters of unbranched or branched alcohols having from 1 to 15 carbon atoms, vinylaromatics, olefins, dienes, vinyl halides, silane monomers, and polysiloxanes having at least one functional group capable of free-radical polymerization.

Preferred esters of acrylic acid or methacrylic acid are esters of unbranched or branched alcohols having from 1 to 15 carbon atoms. Particularly preferred methacrylic esters or acrylic esters are methyl acrylate, methyl methacrylate, ethyl acrylate, ethyl methacrylate, propyl acrylate, propyl methacrylate, n-, iso- and tert-butyl acrylate, n-, iso-, and tert-butyl methacrylate, 2-ethylhexyl acrylate, and norbornyl acrylate. Most preference is given to methyl acrylate, methyl methacrylate, n-, iso-, and tert-butyl acrylate, 2-ethylhexyl acrylate, and norbornyl acrylate.

Preferred dienes are 1,3-butadiene and isoprene. Examples of copolymerizable olefins are ethene and propene. Vinylaromatics that can be copolymerized are styrene and vinyltoluene. From the group of the vinyl halides, those usually used are vinyl chloride, vinylidene chloride, or vinyl fluoride, preferably vinyl chloride.

It is also possible to use one or more silane monomers as monomers c) in stage A). Suitable silane monomers are polymerizable silanes and, respectively, mercaptosilanes in hydrolyzed form. Preference is given to gamma-acryl- and, respectively, gamma-methacryloxy-propyltri(alkoxy)silanes, α-methacryloxymethyltri-(alkoxy)silanes, gamma-methacryloxypropylmethyldi-(alkoxy)silanes, vinylalkyldi(alkoxy)silanes, and vinyltri(alkoxy)silanes, where examples of alkoxy groups that can be used are methoxy, ethoxy, propoxy, isopropoxy, methoxyethylene, ethoxyethylene, methoxypropylene glycol ether, and ethoxypropylene glycol ether moieties. Examples here are vinyltrimethoxysilane, vinyltriethoxysilane, vinyltri-propoxysilane, vinyltriisopropoxysilane, vinyltris(1-methoxy)isopropoxysilane, vinyltributoxysilane, vinyl-triacetoxysilane, 3-methacryloxypropyltrimethoxysilane, 3-methacryloxypropyltriethoxysilane, 3-meth-acryloxypropylmethyldimethoxysilane, 3-methacryloxy-propylmethyldiethoxysilane, methacryloxymethyltri-methoxysilane, methacryloxymethyltriethoxysilane, 3-methacryloxypropyltris(2-methoxyethoxy)silane, vinyl-trichlorosilane, vinylmethyldichlorosilane, vinyltris-(2-methoxyethoxy)silane, trisacetoxyvinylsilane, 3-(triethoxysilyl)propylsuccinic anhydride. Preference is also given to 3-mercaptopropyltrimethoxysilane, 3-mercaptopropyltriethoxysilane, methacryloxymethyltriethoxysilane, and 3-mercaptopropylmethyldimethoxysilane.

Other suitable monomers c) are moreover linear, branched, cyclic, or three-dimensionally crosslinked silicones (polysiloxanes) having at least 10, preferably from 10 to 1000, siloxane repeat units, and having at least one functional group capable of free-radical polymerization. Polymerizable functional groups preferred here are ethylenically unsaturated groups, such as alkenyl groups, e.g. vinyl, ally, and butenyl groups, and also acryloxyalkyl and methacryloxyalkyl groups, where the alkyl moieties comprise from 1 to 4 carbon atoms. Preferred polysiloxanes are α, ω-divinylpolydimethylsiloxanes, α, ω-di(3-acryloxypropyl)-polydimethylsiloxanes, and α, ω-di(3-methacryloxy-propyl)polydimethylsiloxanes. Among the silicones having only one substitution by unsaturated groups, preference is given to α-monovinylpolydimethyl-siloxanes, α-mono(3-acryloxypropyl)polydimethylsiloxanes, α-mono(acryloxymethyl)polydimethylsiloxanes, and α-mono(3-methacryloxypropyl) polydimethylsiloxanes. At the other chain end of the monofunctional polydimethylsiloxanes there is an alkyl or alkoxy moiety, for example a methyl or butyl moiety.

Stage A) preferably uses from 0 to 70% by weight, particularly preferably from 0 to 50% by weight, of monomers c), based in each case on the total weight of the monomers for producing the copolymers from stage A).

Preferred copolymers of stage A) are obtainable via free-radical-initiated polymerization of one or more vinyl esters a), preferably selected from the group comprising vinyl acetate, vinyl pivalate, vinyl laurate, VeoVa9®, VeoVa10®, and VeoVa11®, and of one or more further ethylenically unsaturated monomers b) selected from the group comprising ethylenically unsaturated, epoxy-functional monomers, preferably selected from the group comprising glycidyl acrylate, glycidyl methacrylate (GMA), or allyl glycidyl ether, and optionally of one or more additional monomers c).

Preferred copolymers of stage A) are also obtainable via free-radical-initiated polymerization of one or more vinyl esters a), preferably selected from the group comprising vinyl acetate, vinyl pivalate, vinyl laurate, VeoVa9®, VeoVa10®, and VeoVa11®, and of one or more further ethylenically unsaturated monomers b) selected from the group comprising ethylenically unsaturated carboxylic acids, preferably selected from the group comprising acrylic acid, methacrylic acid, crotonic acid, fumaric acid, maleic acid, 2-hydroxyethyl acrylate, 2-hydroxyethyl methacrylate, and optionally of one or more additional monomers c).

If production of the copolymers in stage A) uses nucleophilic monomers b), electrophilic monomers b) are usually to be selected for the polymer-analogous reaction that follows for producing the products in stage B);
and if electrophilic monomers b) are used to produce the copolymers in stage A), in contrast, nucleophilic monomers b) are generally to be selected for the polymer-analogous reaction that follows for producing the products in stage B).

Examples of preferred and particularly preferred monomers b) for the polymer-analogous reaction in stage B) are the same monomers b) that were listed correspondingly for the polymerization process in stage A).

The monomers b) are therefore generally used in stage B) to introduce ethylenically unsaturated groups as polymerizable group into the copolymers from stage A).

The products in stage B) preferably comprise from 0.1 to 20% by weight, particularly from 0.2 to 10% by weight, most preferably from 0.5 to 4% by weight, of monomers b), based in each case on the total weight of the products in stage B).

Based on the total amount of units of the monomers b) present in the products of stage B), it is preferable that from 10 to 70 mol %, particularly from 20 to 55 mol %, are used in stage B).

The products of stage B) involve fully modified vinyl ester copolymers, or involve partially modified vinyl ester copolymers. Fully modified vinyl ester copolymers are obtainable by reacting all of the monomer units b) of the copolymers from stage A) with a monomer b) during the polymer-analogous reaction in stage B). Partially modified vinyl ester copolymers are obtainable by not reacting all of the monomer units b) of the copolymers from stage A) with a monomer b) during the polymer-analogous reaction in stage B).

It is preferable that from 10 to 100%, particularly from 90 to 100%, of the monomer units b) present in the copolymers from stage A) have been modified via ethylenically unsaturated monomers b). Particularly if the copolymers of stage A) comprise units of monomers from the group of the nucleophilic monomers b), particular examples being ethylenically unsaturated mono- or dicarboxylic acids and salts thereof, it can be advantageous to use partly modified vinyl ester copolymers in stage C), since graft copolymers are then obtained which may have a viscosity-increasing effect in formulations for corresponding applications.

The graft copolymers of the invention are finally obtained by copolymerizing the products from stage B) with one or more ethylenically unsaturated monomers, preferably with one or more monomers from the group comprising vinyl esters a), monomers b) and monomers c). Monomers preferred in stage C) are ethylenically unsaturated mono- or dicarboxylic acids and salts thereof, esters of acrylic acid or methacrylic acid of unbranched or branched alcohols having 1 to 15 carbon atoms, vinyl halides, and vinylaromatics; particular preference is given here to methacrylic acid, acrylic acid, methyl acrylate, methyl methacrylate, vinyl chloride, and styrene; most preference is given to methacrylic acid and styrene.

Stage C) preferably uses from 25 to 99% by weight, particularly from 60 to 98% by weight, of ethylenically unsaturated monomers, based in each case on the total weight of the products in stage C).

The molar masses $M_n$ of the graft copolymers are preferably from 1000 to 400 000 g/mol, particularly preferably from 5000 to 200 000 g/mol, and most preferably from 10 000 to 100 000 g/mol. The data relating to the molar masses $M_n$ are based on the determination method using SEC (Size Exclusion Chromatography) with use of a polystyrene standard in THF at 60° C.

The graft copolymers are distinguished by their polymer architecture. Without being bound to any specific theory regarding the polymer architecture, it is assumed that the graft copolymers consist essentially of polymer chains made of vinyl esters a), of monomers b), and optionally of monomers c), where free-radical-initiated polymerization has been used in stage C) to polymerize polymer chains of ethylenically unsaturated monomers onto the monomer units b) introduced in stage B).

The invention further provides processes for producing graft copolymers via
A) free-radical-initiated polymerization of one or more vinyl esters a),
and of one or more further ethylenically unsaturated monomers b) comprising at least one further functional group,
B) and then polymer-analogous reaction of the copolymers from stage A), by linking monomer units b) thereof to one or more further monomers b) in such a way that at least one group capable of free-radical polymerization is introduced into the copolymers from stage A), characterized in that
C) free-radical-initiated polymerization is used to polymerize one or more ethylenically unsaturated monomers onto the products from stage B).

Process for producing the copolymers of stage A) and for producing the products from stage B) are known to the person skilled in the art and are described by way of example in DE-A 102007055694.

The polymerization process in stage C) is generally carried out in the presence of free-radical initiators by means of free-radical suspension, emulsion, or preferably bulk or solution, polymerization processes.

The solution polymerization process preferably uses, as solvent, an organic solvent, or a mixture of organic solvent, or a mixture of one or more organic solvents and water. Preferred solvents or preferred solvent components in solvent mixtures are selected from the class of the alcohols, ketones, esters, ethers, aliphatic hydrocarbons, aromatic hydrocarbons, and water. Particularly preferred solvents are aliphatic alcohols having from 1 to 6 carbon atoms, e.g. methanol, ethanol, n-propanol, or isopropanol, ketones, such as acetone or methyl ethyl ketone, esters such as methyl acetate, ethyl acetate, propyl acetate, or butyl acetate, or water. Most preference is given to methanol, isopropanol, methyl acetate, ethyl acetate, and butyl acetate.

The reaction temperature for producing the graft copolymers using polyvinyl ester segments is from 20° C. to 160° C., preferably from 40° C. to 140° C. The polymerization process is generally carried out at atmospheric pressure, under reflux.

Examples of suitable free-radical initiators are oil-soluble initiators, such as tert-butyl 2-ethylperoxyhexanoate, tert-butyl peroxypivalate, tert-butyl peroxyneodecanoate, dibenzoyl peroxide, tert-amyl peroxypivalate, di(2-ethylhexyl) peroxydicarbonate, 1,1-bis(tert-butylperoxy)-3,3,5-trimethylcyclohexane, and di(4-test-butylcyclohexyl) peroxydicarbonate. Azoinitiators are also suitable, an example being azobisisobutyronitrile. The amount used of the initiators is generally from 0.005 to 3.0% by weight, preferably from 0.01 to 1.5% by weight, based in each case on the total weight of the monomers for producing the graft copolymers using polyvinyl ester segments.

The polymerization rate can be controlled via the temperature, via the half life times of the initiators, via use of initiator accelerators, or via the initiator concentration.

The person skilled in the art knows how to adjust the molecular weight and the degree of polymerization. This can be achieved by way of example via addition of regulator, via the ratio of solvent to monomers, via variation of initiator concentration, via variation in the feed of monomers, and via variation of polymerization temperature. Regulators or chain-transfer agents are alcohols, e.g. methanol, ethanol, and isopropanol, aldehydes or ketones, e.g. acetaldehyde, propionaldehyde, butyraldehyde, acetone, or methyl ethyl ketone, or else compounds containing mercapto groups, e.g. dodecyl mercaptan, mercaptopropionic acid, or silicones contain mercapto groups.

The polymerization process can be carried out by using all of the, or individual, constituents of the reaction mixture as initial charge, or by dividing all of the, or individual, constituents between initial charge and feeds, or by the feed process with no initial charge.

When the bulk polymerization process is carried out in stage C), the ethylenically unsaturated monomers used in said stage are preferably not reacted completely, i.e. the polymerization process is terminated prior to complete reaction of the ethylenically unsaturated monomers. It is preferable here to use the entire amount of the products from stage B) and of the ethylenically unsaturated monomers, and also of the regulator, and a portion of the initiator, as initial charge. The remaining amount of initiator is used as feed or added all at once. The polymerization process can be terminated at any desired conversion via addition of one or more polymerization inhibitors. An advantage of this procedure is that the graft copolymers are produced in the form of a solution in ethylenically unsaturated monomers, i.e. in the form in which the graft copolymers are used as LPAs. There is therefore no requirement for any separate step for dissolution of the graft copolymers in ethylenically unsaturated monomers.

Polymerization inhibitors that can be used comprise any of the substances commonly used for this purpose, examples being compounds from the class of the hydroquinones, benzoquinones, phenols, and thiols, 1,3,5-trinitrobenzene, sulfur, oxygen, and 2,2-diphenyl-1-pikrylhydrazyl. Particular preference is given to hydroquinone and 4-methoxyphenol.

When the bulk polymerization process is carried out, the polymerization process is preferably terminated at a conversion of from 30 to 90 mol %, preferably after a conversion of from 40 to 70 mol %, based on the amount of ethylenically unsaturated monomers.

When the suspension, emulsion, or solution polymerization process is carried out, the polymerization process is generally carried out until solids content is from 15 to 95% by weight, preferably until solids content is from 40 to 80% by weight.

Volatile residual monomers and other volatile constituents can also be removed by distillation or stripping processes, preferably at reduced pressure.

Surprisingly, the graft copolymers are effective as low-profile additives (LPAs). Polymers having this type of polymer architecture have not hitherto been used as LPAs. It was particularly surprising that the graft copolymers also become effective as LPAs at temperatures as low as room temperature. Furthermore, composite components comprising the graft copolymers of the invention exhibit better pigmentation when compared with composite components correspondingly modified with commonly used LPAs. Pigmentation means color strength, color saturation, surface gloss, and in particular uniform, homogeneous coloring of composite components.

When sheet-like plastics parts are produced via thermal curing of unsaturated polyester resin compositions (UP resins), low-profile additives are added in order to reduce, or compensate, the volume shrinkage that arises during that process. The low-profile additive reduces shrinkage during the hardening process, dissipates intrinsic stresses, reduces microcracking, and facilitates compliance with manufacturing tolerances.

For use as low-profile additive, the graft copolymers are dissolved in reactive monomers, preferably in one or more vinyl esters a) and/or in one or more monomers c), particularly preferably in styrene, and applied optionally with further additives, such as fillers, thickeners, initiators, and processing aids. The graft copolymers can also be used in combination with conventional low-profile additives, by way of example in combination with polyvinyl acetate, polystyrene, carboxy-functional polyvinyl acetates, and polymethyl methacrylate.

Unsaturated polyester resin compositions used usually comprise reaction products of a dicarboxylic acid or of a dicarboxylic anhydride with a polyol. Polyester resin compositions of this type usually also comprise one or more monomers having ethylenically unsaturated groups, generally styrene. Styrene is added to the polyester resin composition in order to dissolve the polyester and in order to ensure that the polyester composition is flowable. The polyester resin compositions also comprise fiber materials, such as glass fiber, carbon fiber, or corresponding fiber mats for reinforcement of the plastics parts obtained using the polyester resin composition (Fiber Reinforced Plastic composites=FRP composites).

The graft copolymers can be used as low-profile additives for any of the commonly used production processes for FRP composites, examples being Sheet Molding Compound technology (SMC), Bulk Molding Compound technology (BMC), Resin Transfer Molding (RTM), and Resin Injection Molding (RIM). The graft copolymers are very particularly suitable for processes in which the composites are produced via curing at room temperature, for example hand lay-up processes, spray-up processes, vacuum infusion processes, vacuum bag molding processes, and Seeman Composites Resin Infusion Molding processes (SCRIMP). In the BMC process, the constituents of the compounded material, which are the styrenic polyester resin solution, the low-profile additive, the crosslinking catalyst, filler, mold-release agent, and optionally further additives, are mixed to give a paste, and then glass fiber is admixed, and pressure and heat are then used to produce the molding. This technique is used by way of example to produce reflectors for automobile head lamps. In the case of the SMC process, a paste is produced by analogy with the BMC process from styrenic polyester resin solution, low-profile additive, crosslinking catalyst, filler, mold-release agent, and optionally further additives, and is applied to two supportive foils. Chopped glass fiber rovings are then scattered onto one of the two layers, and finally the two supportive foils are combined with one another, and the resultant layers are therefore brought into contact with one another. A system of rolls is then used for a compaction process. The resultant sheet-like compounded SMC material is then rolled up and stored under defined conditions for at least three days, this process being termed maturing. Finally, the sheet-like sandwich is peeled from the foil and cut into pieces, and is subjected to pressure and heat in a pressing process to give moldings. Examples of uses of moldings produced by means of this techniques are tailgates of automobiles.

The constitution of the formulations and the amounts used of the low-profile additives depend on the production process selected and are known to the person skilled in the art. The graft copolymers are generally applied in a solution of strength from 10 to 50% by weight in ethylenically unsaturated monomers, preferably styrene. The amount used is generally from 5 to 90 parts by weight, preferably from 30 to 70 parts by weight, of the solution, based on 100 parts by weight of resin.

Use of the graft copolymers as polymer additive, for example as LPA, gives plastics parts with reduced shrinkage, in particular on curing at room temperature.

The graft copolymers are also suitable as modifiers for other applications, for example as additives in plastics processing, for paper coating, or for printing inks or for coatings. By way of example, the graft copolymers can be used here to improve the compatibility of the individual components of appropriate formulations or to improve the printed image, or to produce an oxygen barrier.

The examples below serve for further explanation of the invention, without in any way restricting the same.

Production of the Macromonomers (Products of Stage B)

Macromonomer 1

57.0 g of vinyl acetate, 2.2 g of glycidyl methacrylate, 22.1 g of isopropanol, and 0.5 g of PPV (tert-butyl perpivalate, 75% strength solution in aliphatics) were used as initial charge in a 2 l stirred glass vessel with anchor stirrer, reflux condenser, and feed equipment. The initial charge was then heated to 70° C. under nitrogen at a stirrer rotation rate of 200 rpm. Once the internal temperature of 70° C. had been reached, 367.0 g of vinyl acetate, 12.0 g of glycidyl methacrylate, and 6.2 g of isopropanol and initiator solution (0.8 g of PPV) were used as feed. The feed time for the monomer solution was 240 minutes and the feed time for the initiator solution was 300 minutes. Once the initiator feed had ended, polymerization was continued for a further 2 hours at 80° C. Volatile constituents were removed by distillation in vacuuo at elevated temperature. 16 g of butyl acetate, 0.6 g of inhibitor (hydroquinone), 7.2 g of methacrylic acid, and 2.0 g of catalyst (triphenylphosphine) were fed into the resultant polymer over a period of 20 minutes at 125° C., and the reaction mixture was kept at 125° C. for a further 180 minutes before volatile constituents were removed by distillation. The resultant polymer (macromonomer 1) was isolated. Macromonomer 1 was a fully modified vinyl ester copolymer, i.e. all of the glycidyl methacrylate units had been modified with methacrylic acid. The content of residual monomers in macromonomer 1 was below 0.5% by weight, based on the total weight of the polymer. The Höppler viscosity of macromonomer 1 was 2.3 mPas, determined to DIN 53015 (10% in ethyl acetate at 20° C.), and its number-average molar mass was 13 000 g/mol, determined by means of size-exclusion chromatography in THF at 60° C. against narrowly distributed polystyrene standards.

Macromonomer 2

57.0 g of vinyl acetate, 1.0 g of acrylic acid, 22.1 g of isopropanol and 0.5 g of PPV (tert-butyl perpivalate, 75% strength solution in aliphatics) were used as initial charge in a 2 l stirred glass vessel with anchor stirrer, reflux condenser, and feed equipment. The initial charge was then heated to 70° C. under nitrogen, using a stirrer rotation rate of 200 rpm. Once the internal temperature of 70° C. had been reached, 367.0 g of vinyl acetate, 4.0 g of acrylic acid, and 6.2 g of isopropanol and initiator solution (0.8 g of PPV) were used as feed. The feed time for the monomer solution was 240 minutes and the feed time for the initiator solution was 300 minutes. Once the initiator feed had ended, polymerization was continued for a further 2 hours at 80° C. Volatile constituents were removed by distillation in vacuuo at elevated temperature. 16 g of butyl acetate, 0.6 g of inhibitor (hydroquinone), 9.0 g of glycidyl methacrylate, and 2.1 g of catalyst (triphenylphosphine) were fed into the resultant polymer over a period of 20 minutes at 125° C., and the reaction mixture was kept at 125° C. for a further 180 minutes before volatile constituents were removed by distillation. The resultant polymer (macromonomer 2) was isolated. 91 mol % of the acrylic acid units in macromonomer 2 were glycidyl-methacrylate-modified. The residual monomer content of macromonomer 2 was below 0.5% by weight, based on the total weight of the polymer. The Höppler viscosity of macromonomer 2 (10% in ethyl acetate at 20° C.) was 2.1 mPas, and its number-average molar mass was 11 500 g/mol, determined by means of size-exclusion chromatography against narrowly distributed polystyrene standards.

Production of the Graft Copolymers

Inventive Example 1

Direct Polymerization in Styrene 14.4 g of the polymer macromonomer 1 were dissolved in 299.0 g of styrene in a 1 l stirred glass vessel with anchor stirrer, reflux condenser, and feed equipment, and the mixture was polymerized after addition of 0.02 g of tert-dodecyl mercaptan and 0.25 g of PPV, at 70° C. 0.25 g of PPV was added after respectively 30, 120, and 180 minutes. Finally, the polymerization reaction was terminated after 300 minutes via addition of 0.16 g of an inhibitor (hydroquinone), and the solids content of the resultant product was adjusted to 40% by adding styrene.

The Höppler viscosity of the synthesized graft copolymer (10% concentration in ethyl acetate) was 10.4 mPas, and the number-average molar mass was 31 700 g/mol, determined by means of size-exclusion chromatography against narrowly distributed polystyrene standards.

Inventive Example 2

Suspension Polymerization 60.2 g of macromonomer 1 were mixed with 541.7 g of styrene in a 3 stirred glass vessel with anchor stirrer, reflux condenser, and feed equipment, and the mixture was polymerized after addition of 6.0 g of tert-dodecyl mercaptan, 10 g of tert-butyl 2-ethylperhexanoate, 1204 g of deionized water, and 12.1 g of poly(vinyl alcohol) (Mowiol 56-88), for 240 minutes at 70° C. and then for 120 minutes at 90° C. Once the reaction had ended, the polymer was isolated by drying, and the resultant polymer particles were dissolved in styrene, giving a solution of the grafted polymer at 40% concentration.

The Höppler viscosity of the synthesized graft copolymer (10% concentration in ethyl acetate) was 4.1 mPas, and the number-average molar mass was 25 100 g/mol, determined by means of size-exclusion chromatography against narrowly distributed polystyrene standards.

Inventive Example 3

Solution Polymerization 14.4 g of the polymer macromonomer 2 were dissolved in 200 g of ethyl acetate in a 1 l stirred glass vessel with anchor stirrer, reflux condenser, and feed equipment, and the mixture was polymerized after addition of 100 g of styrene, 0.5 g of tert-dodecyl mercaptan, and 0.5 g of PPV, at 70° C. 0.25 g of PPV was added after respectively 30, 120, and 180 minutes. After 360 minutes, the ethyl acetate was removed by distillation, and the resultant polymer was dissolved in styrene to give a solution of concentration 40%. The Höppler viscosity of the synthesized graft copolymer (10% concentration in ethyl acetate) was 3.7 mPas, and the number-average molar mass was 18 000 g/mol, determined by means of size-exclusion chromatography against narrowly distributed polystyrene standards.

Inventive Example 4

Solution Polymerization 14.4 g of the polymer macromonomer 1 were dissolved in 200 g of ethyl acetate in a 1 l stirred glass vessel with anchor stirrer, reflux condenser, and feed equipment, and the mixture was polymerized after addition of 98 g of styrene, 2 g of methacrylic acid, 0.5 g of tert-dodecyl mercaptan, and 0.5 g of PPV, at 70° C. 0.25 g of PPV was added after respectively 30, 120, and 180 minutes. After 360 minutes, the ethyl acetate was removed by distillation, and the resultant polymer was dissolved in styrene to give a solution of concentration 40%.

The Höppler viscosity of the synthesized graft copolymer (10% concentration in ethyl acetate) was 3.6 mPas, and the number-average molar mass was 19 800 g/mol, determined by means of size-exclusion chromatography against narrowly distributed polystyrene standards.

Comparative Example 5

For comparison, a polymer was produced by analogy with inventive example 1, but without use of macromonomer 1. The Höppler viscosity of the synthesized polystyrene (10% concentration in ethyl acetate) was 6.4 mPas, and the number-average molar mass was 40 600 g/mol, determined by means of size-exclusion chromatography against narrowly distributed polystyrene standards.

Comparative Example 6

For comparison, a polymer was produced by analogy with inventive example 2, but without use of macromonomer 1. The Höppler viscosity of the synthesized polystyrene (10% concentration in ethyl acetate) was 2.8 mPas, and the number-average molar mass was 16 900 g/mol, determined by means of size-exclusion chromatography against narrowly distributed polystyrene standards.

Use of the Graft Polymers as LPAs

1.) Curing of UP Resin Compositions at 23° C.

A mixture was produced from the raw materials listed in table 1, and briefly degassed. The density of the degassed mixture was determined, and the mixture was then poured into a mold and cured for 48 hours at room temperature (23° C.). Finally, the density of the cured molding was determined. Shrinkage was determined via comparison of the densities of the mixture prior to the hardening process and of the molding after the hardening process (table 2). Minus values indicate that the molding after the hardening process was larger than the original mold.

TABLE 1

Formulation for plastics moldings:

| Type | Raw material | Pts. by wt. |
|---|---|---|
| Palapreg ® P18-21 | UP resin (concentration about 65.0% in styrene) | 60.0 |
| LPA | LPA (concentration 40% in styrene) | 40.0 |
| Styrene | Monostyrene | 20.0 |
| Butanox ® M 50 | Peroxide | 1.5 |
| Akzo Nobel NL-49 | Accelerator (1% strength Co in ester) | 0.5 |

Low-profile additives (LPAs) used comprise:
LPA1: Graft copolymer from inventive example 1.
LPA2: Graft copolymer from inventive example 2.
LPA3: Graft copolymer from inventive example 3.
LPA4: Graft copolymer from inventive example 4.
LPAV1 (comparison): Macromonomer 1.
LPAV2 (comparison): Macromonomer 2.
LPAV3 (comparison): Polymer from comparative example 5.
LPAV4 (comparison): Polymer from comparative example 6.
LPAV5 (comparison): Modiper® SV10 A (acid-modified styrene/vinyl acetate block copolymer from Nippon Oil and Fats Company, Limited (JP)).
LPAV6 (comparison): Modiper® SV10 B (styrene/vinyl acetate block copolymer from Nippon Oil and Fats Company, Limited (JP)).
LPAV7 (comparison): Vinnapas® C501 (acid-modified polyvinyl acetate from Wacker Chemie AG (D)).

TABLE 2

Shrinkage of the moldings:

| LPA | Density of mixture prior to hardening process [g/mm³] | Density of molding after curing process at 23° C. [g/mm³] | Shrinkage [%] |
|---|---|---|---|
| — | 1.093 | 1.198 | 8.76 |
| LPA1 | 1.032 | 1.033 | 0.10 |
| LPA2 | 1.033 | 1.028 | −0.49 |
| LPA3 | 1.030 | 1.081 | 0.05 |
| LPA4 | 1.035 | 1.056 | −0.02 |
| LPAV1 | 1.035 | 1.115 | 7.17 |
| LPAV2 | 1.034 | 1.123 | 7.92 |
| LPAV3 | 1.030 | 1.120 | 8.03 |
| LPAV4 | 1.027 | 1.129 | 9.03 |
| LPAV5 | 1.036 | 1.068 | 3.00 |
| LPAV6 | 1.035 | 1.056 | 1.99 |
| LPAV7 | 1.044 | 1.162 | 8.74 |

From table 2 it is apparent that conventional carboxy-functional polyvinyl acetates (Vinnapas® C501), polystyrenes, and the macromonomers are not effective as LPAs in the case of room-temperature curing. Commercial block copolymers based on styrene and vinyl acetate (Modiper® SV10A and Modiper® SV10B) exhibit significantly poorer effectiveness in the case of room-temperature curing, when they are compared with the graft copolymers of the invention.

2. Curing of UP Resin Compositions at 160° C.

A laboratory dissolver was used to produce a resin paste from the resins and additives listed in table 3. Said resin paste was then mixed homogeneously with the filler calcium carbonate and with the glass fibers, in a laboratory kneader. The resultant compounded BMC material was packed in such a way as to prevent styrene leakage and stored at 23° C. for 3 days. The compounded material was then placed in a high-pressure press for pressing (160° C., press force 700 kN, 3 minutes) to give test sheets of thickness 3.0 mm.

TABLE 3

Formulation for compounded BMC material:

| Type | Raw material | Pts. by wt. |
|---|---|---|
| Palapreg ® P18-21 | UP resin (concentration about 65.0% in styrene) | 62.5 |
| CC 9257-45 carbon black | Pigment paste, black | 10.0 |
| LPA | LPA (concentration 40% in styrene) | 20.0 |
| Styrene | Monostyrene | 10.0 |
| Trigonox ® C | Peroxide from AkzoNobel N.V. (NL) | 1.0 |
| Trigonox ® 21 | Peroxide from AkzoNobel N.V. (NL) | 0.5 |
| Luvatol ® MK 35 | Magnesium oxide paste from Lehman &Voss & Co. KG (D) | 3.0 |
| para-Benzoquinone | Inhibitor (10% strength in methyl methacrylate) | 0.3 |
| Hydroquinone | Inhibitor | 0.3 |
| Calcium stearate | Release agent | 4.0 |
| Millicarb ® OG | Calcium carbonate | 300.0 |
| Glass 163D-14C (4 mm) | Glass fibers | 45.0 |

Shrinkage and pigmentation were determined after demolding and cooling. Values determined as a function of the LPA used are recorded in table 4. Linear shrinkage was determined by measurement. Pigmentation was assessed qualitatively by using visual assessment criteria (poor=marked marble effect, highly inhomogeneous distribution of pigments, moderate=slight marble effect or slight inhomogeneity in coloring discernible, good=homogeneous coloring).

TABLE 4

Shrinkage and pigmentation as a function of LPA used:

| LPA | Linear shrinkage [%] | Pigmentation |
|---|---|---|
| — | 0.50 | good |
| LPAV3 | 0.15 | good |
| LPAV7 | 0.06 | poor |
| LPA 1 | 0.05 | good |
| LPA 2 | 0.07 | moderate |
| LPAV5 | 0.10 | moderate |

From table 4 it is apparent that although homogeneous coloring is achieved without LPA, shrinkage is very high: 0.5%. The latter leads to poor surface quality. Although use of carboxy-functional polyvinyl acetate (LPAV7, Vinnapas® C501) achieves good shrinkage control, pigmentation is poor. With polystyrene (LPAV3), shrinkage is high. With the graft copolymers of the invention, in contrast, the desired shrinkage values are achieved and good pigmentation is simultaneously achieved.

What is claimed is:

1. A graft copolymer obtained via
A) forming a copolymer via free-radical-initiated polymerization of one or more vinyl esters a) and one or more further ethylenically unsaturated monomers b) comprising at least one further functional group,
B) and then linking monomer units b) in the copolymer from stage A) to one or more further monomers b) by polymer analogous reaction in such a way that at least one group capable of free-radical polymerization is introduced into the copolymer from stage A), and
C) free-radical-initiated polymerizing of one or more ethylenically unsaturated mono- or dicarboxylic acids or salts thereof, or esters of acrylic acid or methacrylic acid of unbranched or branched alcohols having from 1 to 15 carbon atoms, or vinyl halides or vinylaromatics onto the product from stage B), wherein stage C) uses from 60 to 98% by weight of said ethylenically unsaturated monomers, based on the total weight of the graft copolymer produced in stage C), and wherein the molar mass Mn of the graft copolymer is from 1000 to 400 000 g/mol.

2. The graft copolymer as claimed in claim 1, wherein vinyl esters a) used comprise one or more vinyl esters of unbranched or branched carboxylic acids having from 1 to 20 carbon atoms.

3. The graft copolymer as claimed in claim 1, wherein monomers b) selected comprise one or more monomers from the group consisting of ethylenically unsaturated mono- and dicarboxylic acids and salts thereof, monoesters of fumaric acid or of maleic acid, ethylenically unsaturated sulfonic acids and salts thereof, ethylenically unsaturated alcohols, ethylenically unsaturated primary, secondary, or tertiary amines, ethylenically unsaturated amides, ethylenically unsaturated phosphonic acids and salts thereof, ethylenically unsaturated epoxides having from 1 to 20 carbon atoms, ethylenically unsaturated isocyanates, and ethylenically unsaturated anhydrides.

4. The graft copolymer as claimed in claim 1, wherein the copolymer of stage A) is obtained via free-radical-initiated polymerization of one or more vinyl esters a),
and of one or more further ethylenically unsaturated monomers b) selected from the group consisting of ethylenically unsaturated, epoxy-functional monomers b) and optionally of one or more additional monomers c).

5. The graft copolymer as claimed in claim 1, wherein the copolymer of stage A) is obtained via free-radical-initiated polymerization of one or more vinyl esters a),
and of one or more further ethylenically unsaturated monomers b) selected from the group consisting of ethylenically unsaturated carboxylic acid b) and optionally of one or more additional monomers c).

6. The graft copolymer as claimed in claim 4, wherein, in stage B), one or more monomers b) are used from the group consisting of ethylenically unsaturated mono- and dicarboxylic acids and salts thereof, monoesters of fumaric acid or of maleic acid, ethylenically unsaturated sulfonic acids and salts thereof, ethylenically unsaturated alcohols, ethylenically unsaturated primary, secondary, or tertiary amines, ethylenically unsaturated amides, and ethylenically unsaturated phosphonic acids and salts thereof.

7. The graft copolymer as claimed in claim 5, wherein, in stage B), one or more monomers b) are used from the group consisting of ethylenically unsaturated epoxides having from 1 to 20 carbon atoms, ethylenically unsaturated isocyanates, and ethylenically unsaturated anhydrides.

8. The graft copolymer as claimed in claim 1, wherein, in stage A), additional use is made of one or more monomers c) selected from the group consisting of methacrylic esters and acrylic esters of unbranched or branched alcohols having from 1 to 15 carbon atoms, vinylaromatics, olefins, dienes, vinyl halides, silane monomers, and polysiloxanes having at least one functional group capable of free-radical polymerization.

9. The graft copolymer as claimed in claim 1, wherein the ethylenically unsaturated monomers in stage C) are selected from the group consisting of methacrylic acid, acrylic acid, methyl acrylate, methyl methacrylate, vinyl chloride, and styrene.

10. The graft copolymer as claimed in claim 1, wherein the ethylenically unsaturated monomers in stage C) are selected from the group consisting of methacrylic acid and styrene.

11. A process for producing a graft copolymer, comprising
A) forming a copolymer by free-radical-initiated polymerization of one or more vinyl esters a) and one or more further ethylenically unsaturated monomers b) comprising at least one further functional group,
B) and then linking monomer units b) in the copolymer from stage A) to one or more further monomers b) by polymer analogous reaction in such a way that at least one group capable of free-radical polymerization is introduced into the copolymer from stage A), and
C) free-radical-initiated polymerizing one or more ethylenically unsaturated mono- or dicarboxylic acids or salts thereof, or esters of acrylic acid or methacrylic acid of unbranched or branched alcohols having from 1 to 15 carbon atoms, or vinyl halides or vinylaromatics onto the product from stage B), wherein stage C) uses from 60 to 98% by weight of said ethylenically unsaturated monomers, based on the total weight of the graft copolymer produced in stage C), and wherein the molar mass Mn of the graft copolymer is from 1000 to 400 000 g/mol.

12. A composition comprising the graft copolymer of claim 1 as a low-profile additive (LPA), wherein the composition further comprises an unsaturated polyester.

13. A plastics composition, paper coating, printing ink or coating comprising the graft copolymer of claim 1.

14. The graft copolymer as claimed in claim 1, wherein the monomers b) applied in stage A) constitute 0.5 to 4% of the total weight of the monomers used for producing the copolymer from step A).

15. The graft copolymer as claimed in claim 1, wherein the molar mass Mn of the graft copolymer is from 5000 to 200 000 g/mol.

16. The graft copolymer as claimed in claim 1, wherein the product in stage B) comprises from 0.1 to 20% by weight of monomers b), based on the total weight of the product in stage B).

17. The graft copolymer as claimed in claim 1, wherein the further monomers b) applied in stage B) constitute from 10 to 70 mol % of the total amount of units of all monomers b) present in the product of stage B).

18. The graft copolymer as claimed in claim 1, wherein the further monomers b) applied in stage B) introduce ethylenically unsaturated groups as polymerizable groups into the copolymer from stage A).

* * * * *